(12) United States Patent
Horiuchi

(10) Patent No.: US 6,821,036 B2
(45) Date of Patent: Nov. 23, 2004

(54) KEYBOARD ALLOWING FOR SIMPLE, COST-EFFECTIVE PRODUCTION

(75) Inventor: Mitsuo Horiuchi, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/254,468

(22) Filed: Sep. 25, 2002

(65) Prior Publication Data

US 2003/0072596 A1 Apr. 17, 2003

(30) Foreign Application Priority Data

Sep. 25, 2001 (JP) ........................................ 2001-291256

(51) Int. Cl.⁷ .............................................. G06F 3/023
(52) U.S. Cl. ...................................... 400/490; 400/472
(58) Field of Search .......................... 200/343; 400/472, 400/490, 495, 495.1

(56) References Cited

U.S. PATENT DOCUMENTS 6,580,044 B2 * 6/2003 Ogawa et al. ............... 200/552

FOREIGN PATENT DOCUMENTS

| JP | 09082174 A | * | 3/1997 | ........... H01H/13/70 |
| JP | 10334761 A | * | 12/1998 | ........... H01H/13/14 |
| JP | 2000138017 A | * | 5/2000 | ........... H01H/13/14 |
| JP | 2001067966 A | * | 3/2001 | ............. H01H/3/12 |
| JP | 2001085872 A | * | 3/2001 | ............ H05K/7/12 |
| JP | 2001245036 A | * | 9/2001 | ............ H04M/1/23 |

OTHER PUBLICATIONS

Machine translation of JP 200167966 to Takashima et al. from Japanese Patent Office website.*
Machine translation of JP 10334761 to Igarishi from Japanese Patent Office website.*

* cited by examiner

*Primary Examiner*—Daniel J. Colilla
(74) *Attorney, Agent, or Firm*—Scott W. Reid (57) ABSTRACT

A keyboard includes a plurality of keys arranged in at least one continuous row and formed of a key member and a cover member. These members are combined by inserting positioning pins of the cover member into holes of the key member. Curved portions are provided at a plurality of positions in side support portions of the key member. Even if the cover member and the key member are produced with manufacturing errors in alignment, the curved portions may be deformed to prevent misalignment between openings on the cover member and key top portions on the key member when the positioning pins are inserted into the holes. Elastically deformable arms extending from the side support portions of the key member support the key tops and enable the key tops to move up and down.

12 Claims, 6 Drawing Sheets

KEYBOARD ALLOWING FOR SIMPLE, COST-EFFECTIVE PRODUCTION

FIELD OF THE INVENTION

The present invention relates to computer systems and other devices having keyboards and more particularly to keyboards. Even more particularly, the present invention relates to a simpler and more cost-effective way of designing and producing the keys on such keyboards.

BACKGROUND OF THE INVENTION

As is well-known, in various devices including personal computers (PC) and electronic desk calculators, a keyboard to be operated by a user is constructed so that each of a plurality of keys is capable of movement through an upstroke/downstroke (hereinafter referred to as "up/down movement" in this specification). The functions required of such keys include, in addition to a function of allowing the key top to move up and down, a function of operating a switch provided on a circuit board at a position below each key, and a function of returning the key top to the home position after allowing the key top to be depressed, and also include, as a function for enabling a user to feel improved key response when operating the key, a function of stopping the key from shifting in any direction other than the vertical direction when the key top moves up and down.

Figure 6:
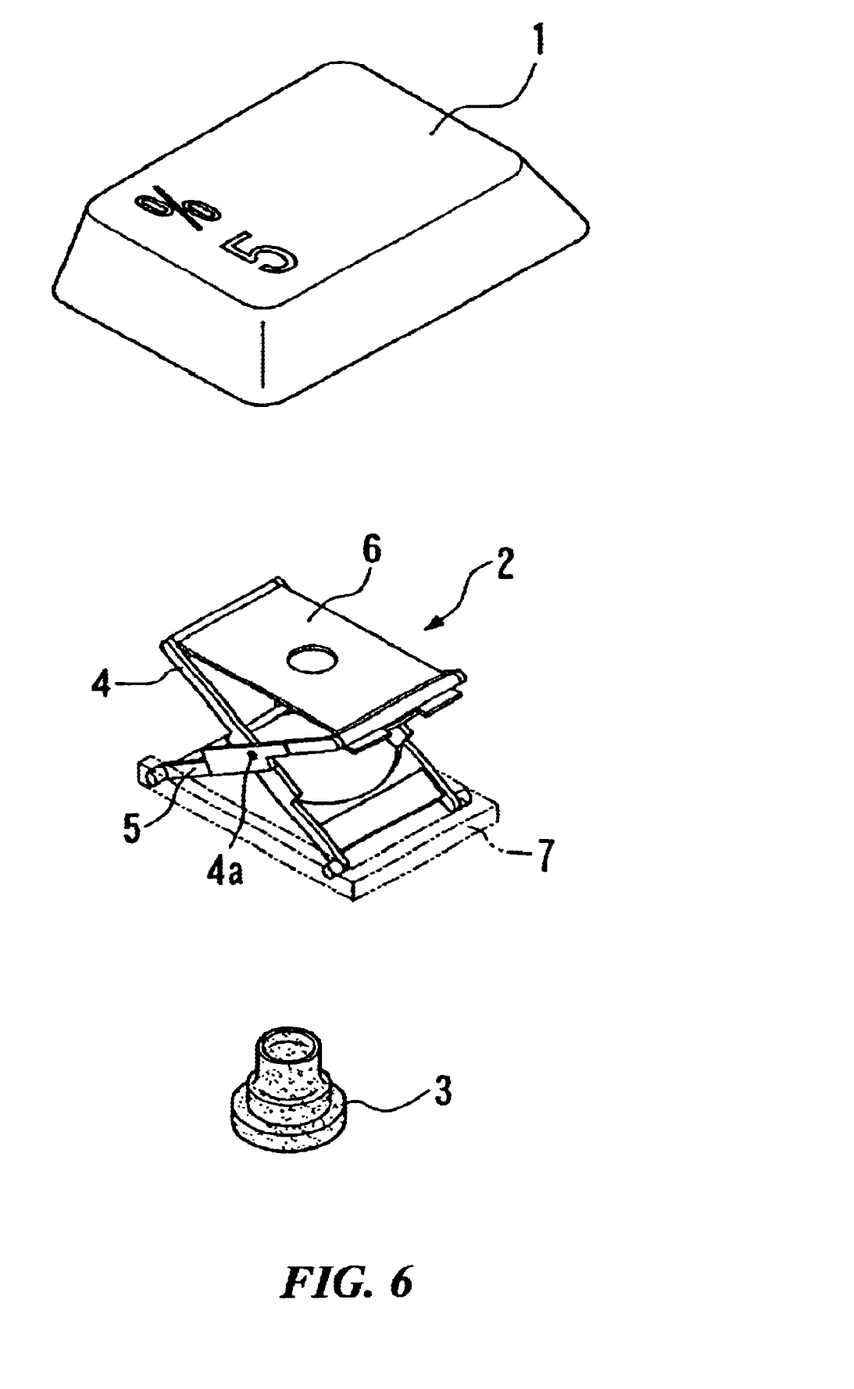
FIG. 6 is a diagram showing an example of a conventional key structure.

FIG. 6 shows an example of a known structure of a key having such functions. In FIG. 6 are illustrated a key top 1 forming a key face, reference numeral 2 denotes an up/down mechanism which supports the key top 1 so that the key top 1 can move up and down, and reference numeral 3 denotes a rubber dome for returning the key top to the home position.

The up/down mechanism 2 is constituted by a pair of arms 4 and 5, a top plate 6, and a fixing member 7. In this up/down mechanism 2, the arms 4 and 5 are rotatably connected to each other by a shaft 4a so as to operate as a pantograph or scissor, thereby enabling movement in the up/down direction. The top plate 6 is rotatably connected at its one end to the arm 4 and slidably engages with the arm 5 at the other. The top plate 6 has a function of operating as an element for reinforcing the arms 4 and 5 when the arms 4 and 5 expand or contract, and a function of receiving the top end of the rubber dome 3. The fixing member 7 slidably fixes the lower ends of the arms 4 and 5 on an unillustrated base plate.

The rubber dome 3 is made of an elastic material, which is a kind of rubber or the like. The rubber dome 3 is placed inside the up/down mechanism 2 and its top end is brought into abutment against the lower surface of the top plate 6 of the up/down mechanism 2. A downwardly-projecting projection is provided on the reverse side of the top end of the rubber dome 3 to operate a switch in a membrane sheet (circuit board) provided on the unillustrated base plate.

In the thus-constructed key, when a user depresses the key top 1, the up/down mechanism 2 operates so as to contract. The rubber dome 3 is thereby compressed and deformed to move its top end downward. With the downward movement of the top end, the unillustrated projection provided on the reverse side of the top end presses the switch, thereby enabling the key top 1 operation to be detected.

The compressed and deformed rubber dome 3 has a force for restoring its original shape. When the user stops pressing the key top 1 downwardly, the top plate 6 is moved upward by the restoring force of the rubber dome 3 to expand the up/down mechanism 2, thereby returning the key top 1 to the home position.

There are problems associated with a key having the above-described construction in that the structure of the up/down mechanism 2 is particularly complicated and the parts cost and assembly cost are therefore high. As is well-known, a keyboard has a plurality of keys, assembly of the parts of each key is time-consuming, and the total number of parts is considerably large. Therefore it is important to solve the above-described problem.

The number of parts of the up/down mechanism 2 may, of course, be reduced in any number of ways. From the viewpoint of maintaining the desired stability of the key during up/down movement, however, it must be said that it is difficult to reduce the number of parts without sacrificing other desirable characteristics of the key—such as stability, feel, consistency, etc. Therefor, it is an object of the present invention to provide kays on a keyboard which provide a user with the desired feel and stability of current keyboards but which may be produced using fewer parts and at a lower cost.

SUMMARY OF THE INVENTION

The inventors of the present invention have studied eagerly with this object and found it effective to form a plurality of keys as one integral component. However, problems described below arise in a case where a plurality of keys are formed as one integral component.

Figure 5A:
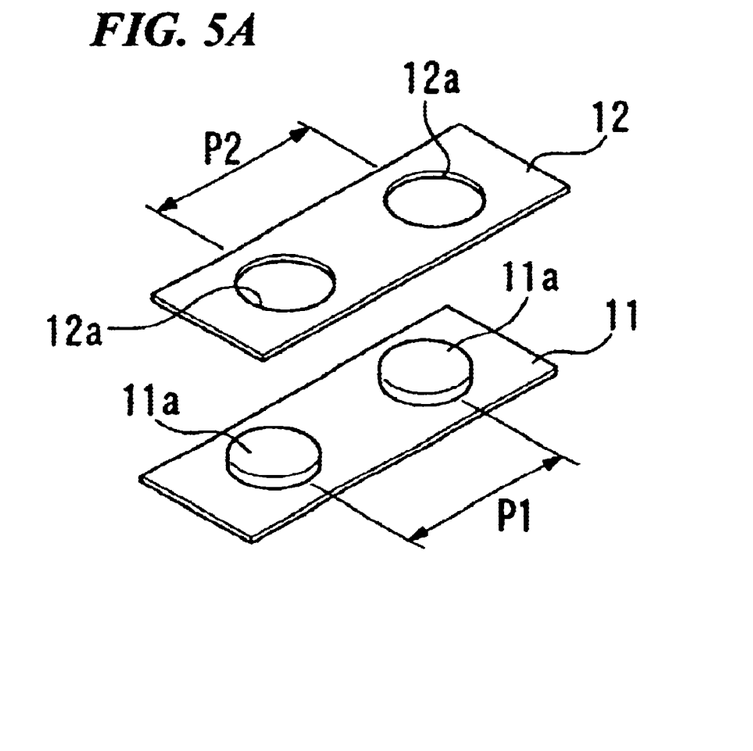
FIG. 5 shows a problem in a case where a plurality of keys are arranged in a continuous row, and comprises a diagram (a) showing the relationship between the cover member and the key member, and a diagram (b) showing a state in which the key is placed one-sidedly.

As shown in FIG. 5(a), in a case where keys are formed by combining a key member 11 and a cover 12, a plurality of (e.g., two) key tops 11a formed on the key member 11 so as to project upward therefrom are fitted in holes 12a formed in the cover 12.

Ordinarily, the above-described key member 11 and cover 12 are provided as molded resin components. Any combination of a plurality of components, including such molded resin components, entails a problem relating to a working error.

A predetermined tolerance is given on each of the distance P1 between key tops 11a and the distance P2 between the holes 12a determined at the time of resin molding. For example, in a case where a row of a plurality of keys is formed such that each of the distances P1 and P2 between the keys placed at the opposite ends exceeds 100 mm, a tolerance of typically ±0.25 mm exists. In this case, if the distance P1 of the resin molded key member 11 includes a working error of −0.25 mm and if the distance P2 of the cover 12 includes a working error of +0.25 mm, a total error of 0.50 mm exists between the two distances.

Figure 5B:
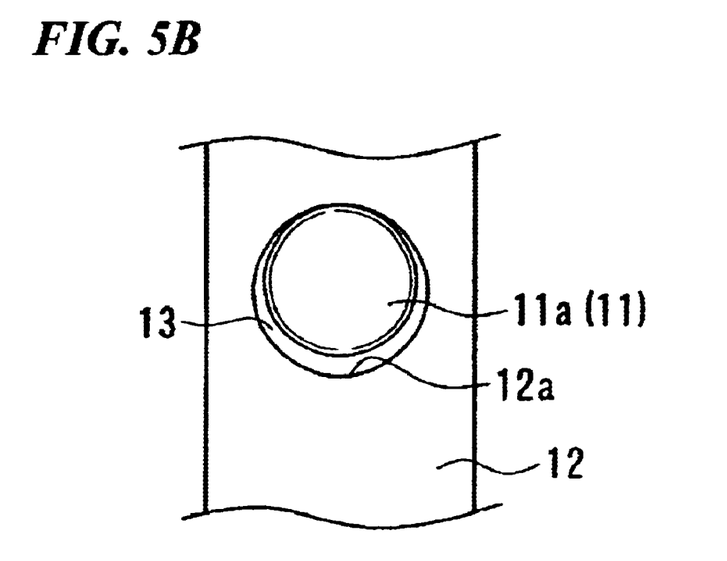

Then, when the key top 11a of the key member 11 is fitted around the hole 12a of the cover 12 shown in FIG. 5(b), the center of the key top 11a is out of alignment with the center of the hole 12a, even though each of the key member 11 and the cover 12 has the accuracy within the tolerance.

If such a misalignment exists, interference may occur between the key top 11a and the hole 12a to impede the up/down movement of the key top 11a. To avoid this interference, a clearance is set between the outside diameter of the key top 11a and the inside diameter of the hole 12a by factoring in an error within the above-described tolerance.

However, a state where the amount of misalignment of the key top 11a with the hole 12a in one direction is so large that a portion of the gap 13 around the key cap 11a narrows or disappears, as shown in FIG. 5(b), is undesirable in terms of appearance. For this reason, the clearance may be increased to ensure that the gap 13 is continuously formed along the entire perimeter of the key top 11a. From the keys with an increased clearance, however, a user may have the impression that the working accuracy of the entire PC is low. Also, the possibility of foreign objects or the like entering through the gap 13 is increased.

The above-described problems become more serious if the number of keys continuously arranged to form one integral component is increased or if the length of the integral component is increased.

The above-described problems can of course be solved if the working error at the time of molding of each of the key member 11 and the cover 12 is reduced. However, this is not an effective solution of the problems since use of means for reducing the working error of the molded resin components leads directly to a considerable increase in mold cost.

A computer system in accordance with the present invention provided by considering the above-described problems has a keyboard of a construction in which a plurality of keys arranged in a continuous row at least in one direction are supported on a frame having an adjustment portion for enabling adjustment of the position of each of the plurality of keys in the above-mentioned direction. Preferably, the plurality of keys are integrally supported on the frame.

The adjustment portion may be of any construction if it enables adjustment of the position of each of the keys supported on the frame. A deformable portion which is a portion of the frame deformable in the lengthwise direction of the frame may be provided as the adjustment portion. The frame is deformed in the lengthwise direction to adjust the pitch (interval) of the keys supported on the frame. Thus, in the structure in which the plurality of keys are supported on the frame, the position of each key can be adjusted to absorb working errors of the components.

An arrangement is conceivable in which an up/down mechanism, e.g., the mechanism 2 shown in FIG. 6 is used as a mechanism for enabling keys to move up and down and is supported on a frame. However, from the viewpoint of the object of reducing the number of parts by integrally combining a plurality of parts in accordance with the present invention, it is preferred that the frame itself have a mechanism for enabling the keys to move up and down. That is, elastically deformable arms extending from the frame are formed and the keys are provided on the arms. In this case, the keys may be formed integrally with the arms or may be provided as separate parts to be attached to the arms.

If a cover member which can close space between the plurality of keys are provided on the keyboard, it is preferable to form positioning portions such as pins for positioning the keys supported on the frame. The frame on which the keys are supported is corrected by the positioning portions to adjust the positions of the keys.

The present invention can also be grasped as a device not limited to the computer system. This device is characterized by including a plurality of keys, a frame extending in a direction corresponding to the direction of arrangement of the plurality of keys in a continuous row, and arms extending from the frame and capable of enabling the plurality of keys to move up and down. In the device thus constructed, the number of parts constituting the keys can be limited to the smallest possible number.

The frame is provided on both sides of the continuous row of the plurality of keys arranged in one direction. Curved/bent portions curved or bent laterally may be provided on the frame. The curved/bent portions are provided for adjustment of the pitch of the plurality of keys.

The present invention can also be grasped as a keyboard having a plurality of keys. This keyboard is characterized by including a frame provided with adjustment portions for adjusting the spacing between the plurality of keys and positioning portions for positioning the keys on a base of the keyboard.

This keyboard may also have a cover member which closes space between the plurality of keys. Preferably, positioning pins for positioning the positioning portions on the base are provided on the cover member. While the spacing between the keys is adjusted by the adjustment portion, the keys are positioned and fixed by the positioning portions. It may otherwise be said that the keys are positioned on the cover member, but the positioning in this expression is essentially the same as positioning of the positioning portions on the base since both the keys and cover member are mounted on the base.

In this case, the plurality of keys are not always arranged in a continuous row in one direction. For example, the present invention may be applied to an arrangement in which keys are alternately placed on opposite sides of a line, i.e., a staggered key layout.

A keyboard in another aspect of the present invention has a frame on which a plurality of keys arranged in one direction are supported so as to be able to move up and down, and which is provided with a deformable portion capable of deforming along the direction of arrangement of the plurality of keys and holes provided on opposite sides of the deformable portion. This keyboard also has a cover having openings through which the plurality of keys are exposed, the cover also having pins which are passed through the holes of the frame to be fixed on a base. If the frame and the cover have variations in size due to working errors or temperatures, the frame is fixed while absorbing the errors in such a manner that the pins of the cover are passed through the holes provided on the opposite sides of the deformable portion of the frame and are fixed on the base.

A key member constituting the keyboard of the present invention is characterized by including a pair of side support portions, a plurality of key tops placed between the pair of side support portions, and arms each having its one end connected to one of the key tops and the other end connected to one of the side support portions, each arm being elastically deformable. In this arrangement, when one of the key tops is pressed, the arms are elastically deformed to realize stroke movement of the key.

If a curved/bent portion is formed on each side support portion between each adjacent pair of said key top, the pitch of the keys can be adjusted.

Preferably, the arms extend from the corresponding one of the key tops toward the pair of side support portions so as to have a shape similar to the shape of the letter V, and the next key top is located between these arms extending generally in the form of V. In this manner, the length of the arms is maximized.

In other words, the other ends of the arms are connected to the side support portions in the vicinity of the next key top adjacent to the key top to which the one ends of the arms are connected.

This arrangement, in which each pair of arms are respectively joined to the side frames on opposite sides of the row of the plurality of keys, is not exclusively used. For example, another arrangement is possible in which a pair of arms extending from each key top are joined only to one of the frames located on opposite sides of the row of the plurality of keys.

Preferably, each of the above-described arms is formed so that its sectional area is smaller at the other end on the side support portion side than at the one end, whereby deformation of the arm when the key top is pressed for a key operation is concentrated in a portion closer to the other end. In contrast, in an arm without such a change in sectional area, deformation of the arm is generally uniform through the entire length of the arm. In comparison between these types of arms, while the inclination of the key top surface on the one end of the arm without a change in sectional area is large, the inclination of the key top surface can be reduced in the case of the above-described arm in which deformation is concentrated at a position closer to the other end.

BRIEF DESCRIPTION OF THE DRAWINGS

Hereafter, the present invention will be described in detail in accordance with the embodiment(s) shown in the accompanying drawings, in which.

DETAILED DESCRIPTION OF THE INVENTION

Figure 1:
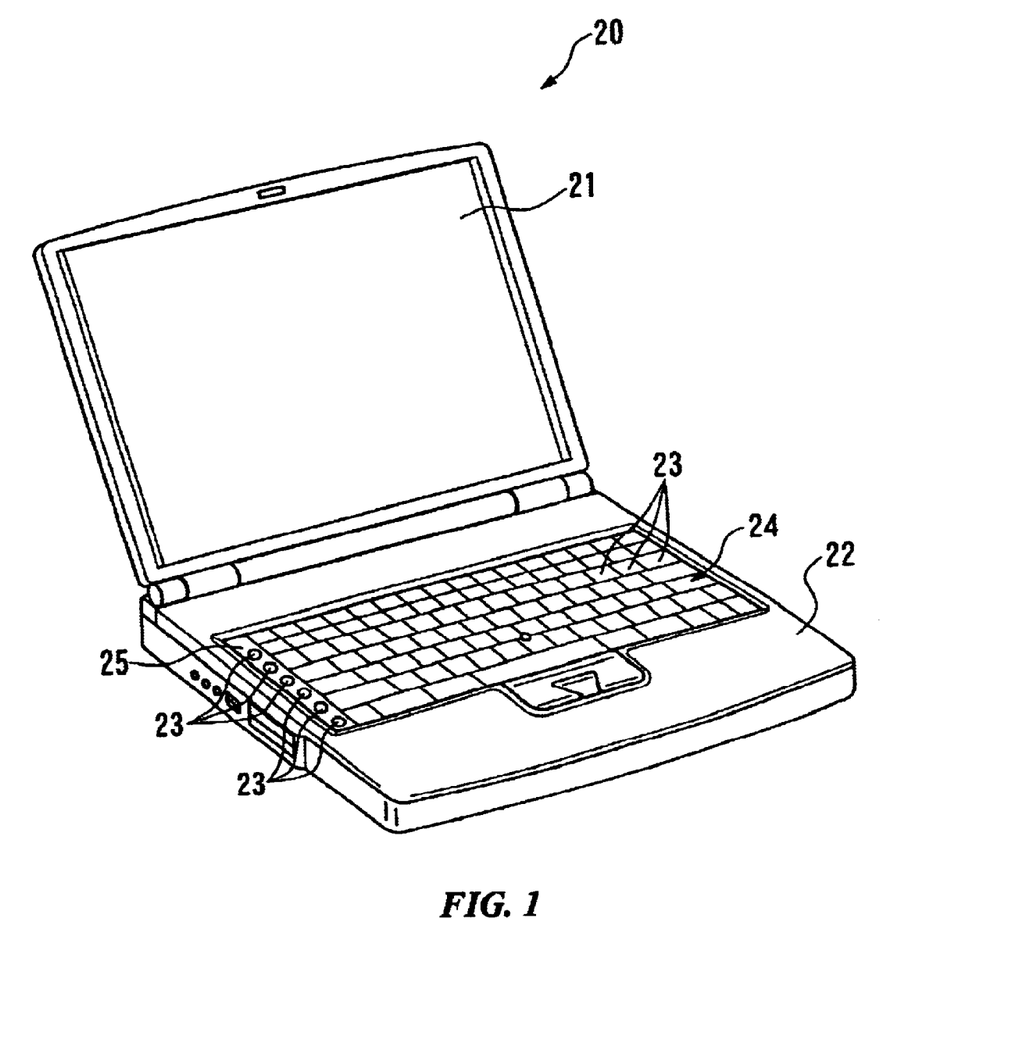
FIG. 1 is a diagram showing an example of a PC having a keyboard in an embodiment of the present invention.

Referring to FIG. 1, the PC 20 provided as a computer system device is of a notebook type and has a monitor portion (display section) 21 for displaying images, and a main body portion 22 incorporating a mother board, a HDD, etc. The mother board is provided as a control unit which controls display contents on the monitor portion 21. The monitor portion and the main body portion are open/closably connected to each other.

A keyboard 24 on which a certain number of keys 23 are arranged in a certain layout is provided in an upper surface of the main body portion 22.

In this embodiment, the present invention is applied to some of keys 23 provided on the keyboard 24, e.g., a function key block 25 which is provided in a left-hand portion of the keyboard 24, and in which a certain number of (e.g., six) keys 23 are arranged in a continuous row in one direction.

Figure 2:
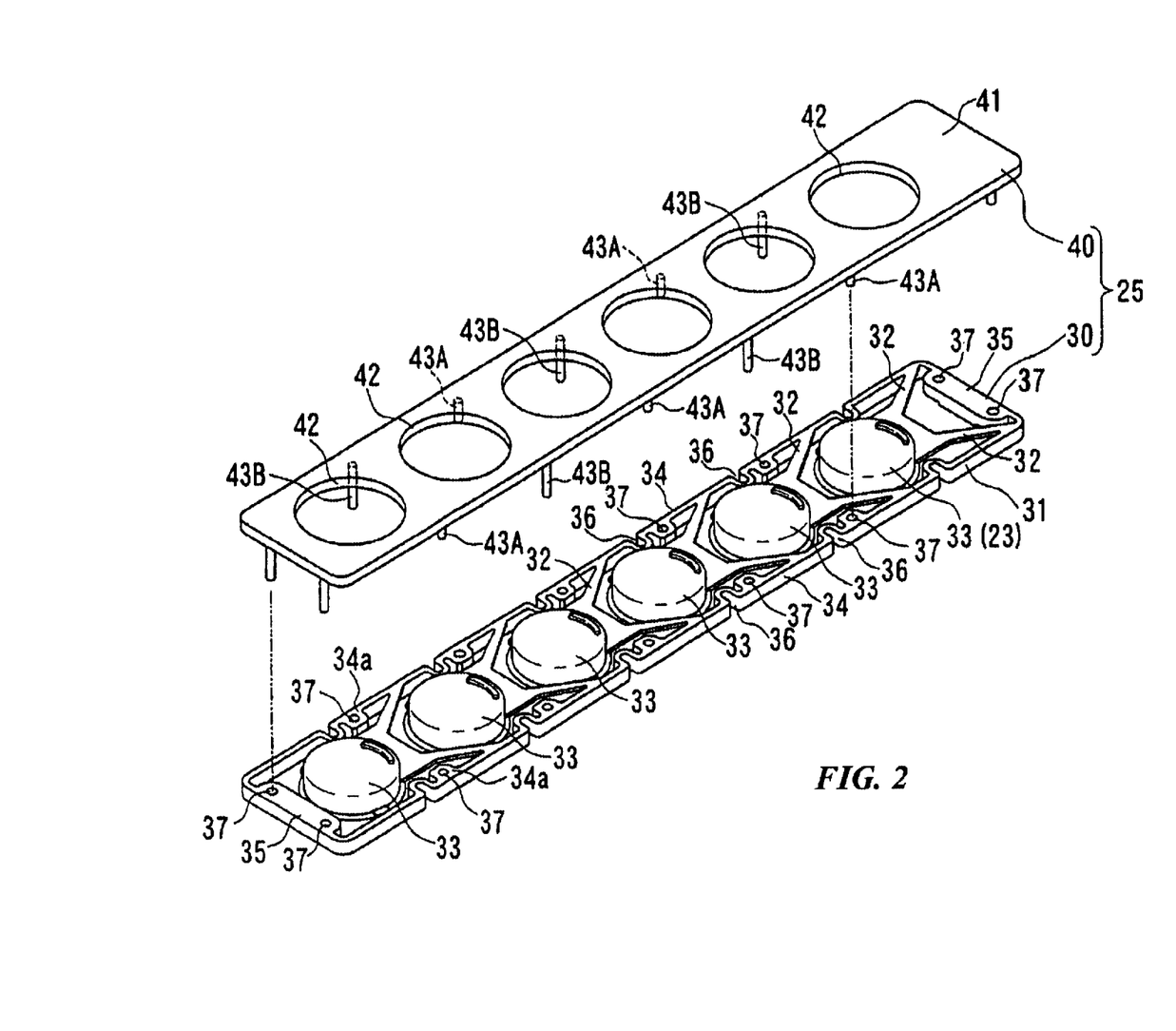
FIG. 2 is a perspective view of a cover member and a key member.

As shown in FIG. 2, the function key block 25 is constituted by a key member 30 and a cover member 40.

Figure 3A:
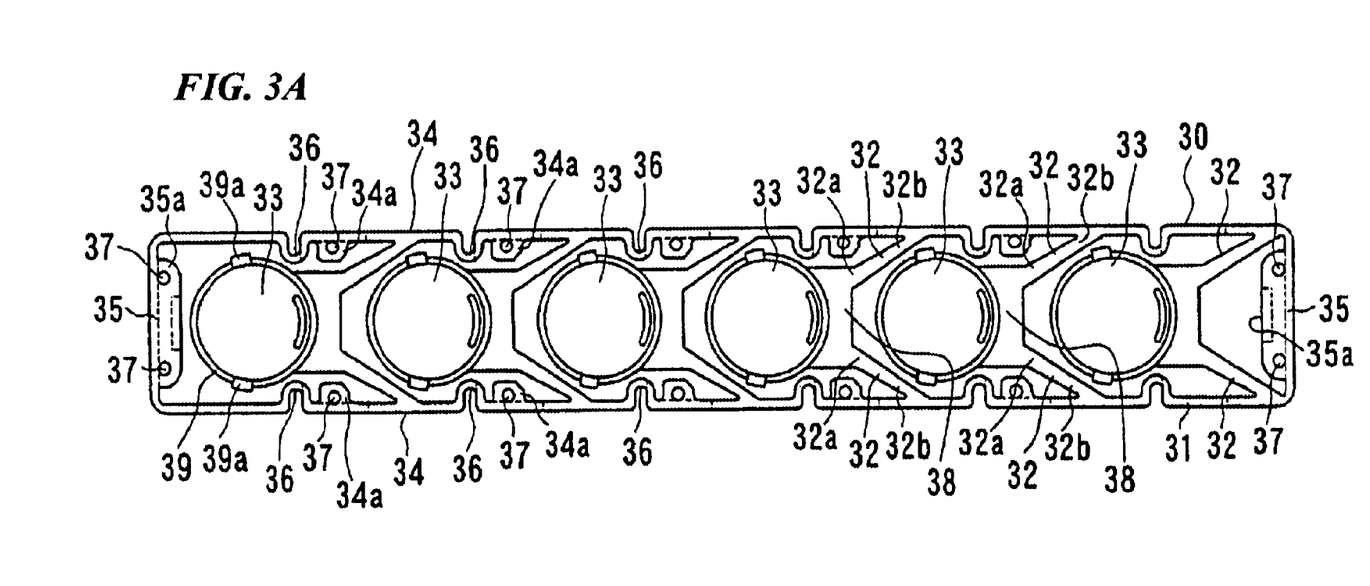
FIG. 3 comprises a plan view and a side view of the key member.
Figure 3B:
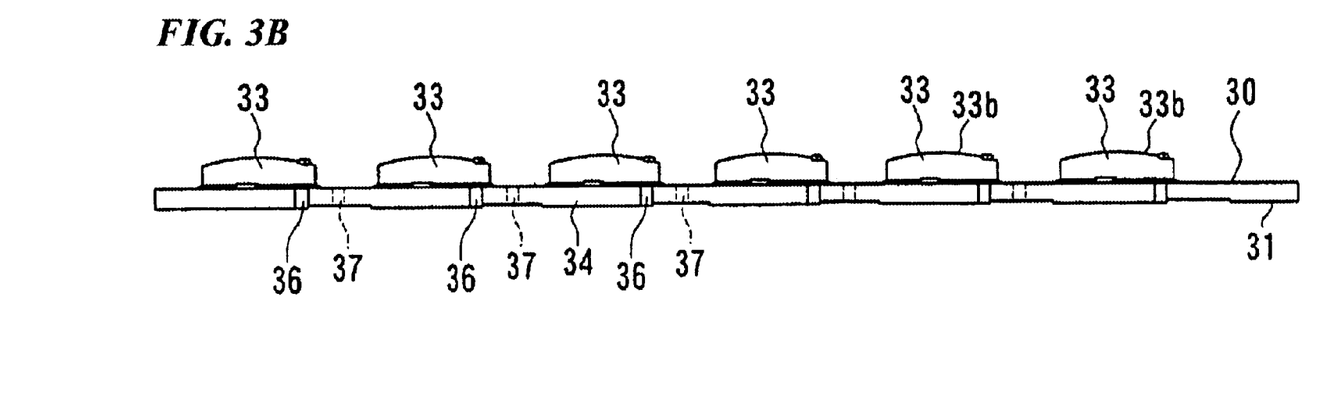

As shown in FIGS. 2 and 3, the key member 30, which is made of a resin, has a frame 31 whose entire shape is generally rectangular, pairs of arms 32 extending inwardly from the frame 31, and key top portions (key tops) 33 formed integrally with ends of the arms 32 and constituting keys 23. The frame 31, the arms 32, and the key top portions 33 are formed integrally with each other. In this embodiment, six key top portions 33, for example, are arranged in a continuous row in one direction to form the key member 30.

The frame 31 is formed by a pair of side support portions 34 and end joint portions 35 so as to have a generally rectangular shape as a whole. The side support portions 34 are positioned on opposite sides of the row of the key top portions 33 and extend along the same. The pair of side support portions 34 are connected at their opposite ends by the end joint portions 35.

In the side support portions 34, curved portions (adjustment portions, shaped portions, curved/bent portions) 36 each bent into a shape similar to the shape of the letter U are formed at a plurality of positions along the lengthwise direction of the side support portions 34. The curved portions 36 is elastically deformable in the lengthwise direction of the side support portions 34, i.e., in such a direction that the generally U-shaped opening narrows or expands, thereby enabling the side support portions 34 to expand or contract. In this embodiment, curved portions 36 are formed at predetermined positions corresponding to the key top portions 33.

On each side support portions 34, projections 34a are formed at a plurality of positions along the lengthwise direction of the side support portion 34 so as to project inwardly inside the frame 31. In each projection 34a, a hole (positioning portion) 37 is formed which functions as a positioning hole when the frame 31 is combined with the cover member 40, as described below. Each hole 37 provided in the side support portion 34 is formed at least in front or at the rear of one of the curved portions 36 as seen in the direction of continuous arrangement of the plurality of key top portions 33. In this embodiment, a number of holes 37 corresponding respectively to the key top portions 33 are provided in each side support portion 34 at predetermined positions, e.g., in the vicinities of the curved portions 36. Also, a projection 35a in which holes 37 are also formed is formed on each end joint portion 35.

As shown in FIG. 3(a), the pairs of arms 32 extending from the two side support portions 34 have their extreme end portions 32a formed integrally with the key top portions 33. That is, each key top portion 33 is supported on the frame 31 by the pair of arms 32.

The arms 32 respectively meet the side support portions 34 so that a predetermined angle is formed between each arm 32 and the corresponding side support portion 34. In other words, each pair of arms 32 extend from the key top portion 33 so as to have a shape similar to the shape of the letter V such that the distance therebetween is gradually increased, and their base ends 32b meet the side support portions 34 at positions in the vicinity of and on opposite sides of the next key top portion 33. The next key top portion 33 is positioned between the pair of arms 32 extending generally in the form of the letter V.

At a position where each pair of arms 32 meet each other at their extreme end portions 32a in the vicinity of the key top portion 33, a reinforcing portion 38 in the form of a plate is formed between the pair of arms 32. Each arm 32 is formed by being tapered from the extreme end portion 32a toward the base end portion 32b.

Figure 4:
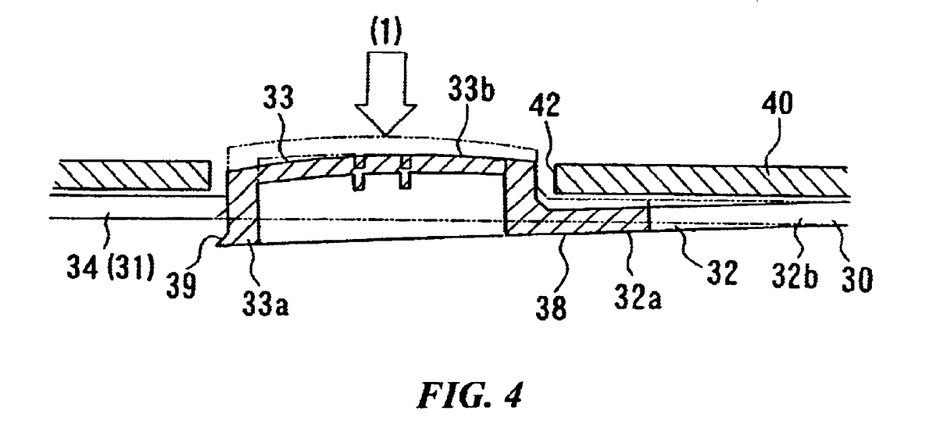
FIG. 4 is a diagram showing deformation of the key member when the hey is operated.

As shown in FIG. 4, each pair of arms 32 thus formed are elastically deformed to allow the corresponding key top portion 33 to be displaced when the key top portion 33 is pressed in a direction perpendicular to a plane defined along a major side of the frame 31 (in the direction of arrow (1) in the figure). At this time, since the pair of arms 32 are smaller in sectional area on the base end 32b side and are connected to the reinforcing portion 38 on the extreme end side 32a, deformation of the arms 32 is concentrated on portions closer to the base ends 32b.

For example, each key top portion 33 has a generally dome-like shape generally circular as seen in a plan view and opened at its lower end 33a. A section of each key top portion 33 closer to a face surface 33b of the same touched by a user when the user operates the key 23 is formed so as to project away from the plane defined by the arms 32 and the frame 31 on one side of the plane. Since the frame 31 and the arms 32 are formed so as to be uniform in thickness, only the key top portions 33 protrude from the key member 30 on one side.

An extreme end portion of an unillustrated rubber dome is brought into abutment against the backside surface of the face surface 33b of the key top portion 33. This rubber dome is made of an elastic material, which is a kind of rubber or the like, as is the rubber dome 3 shown in FIG. 6 as a component in the conventional arrangement. The rubber dome has the function of operating a switch in a membrane sheet provided on an unillustrated base plate when the key top portion 33 is depressed, and the function of returning the depressed key top portion 33 to the home position.

A flange 39 is formed integrally with each key top portion 33 so as to extend outwardly from the lower end 33a. The outside diameter of the flange 39 is set to a value approximately equal to the inside diameter of an opening 42 of the cover member 40 described below. The flange 39 is intended for visually closing the gap between the key top portion 33 and the edge of the opening 42. As shown in FIG. 3(a), a stopper 39 projecting beyond a line defined by the inside diameter of the opening 42 is formed in a plurality of places, e.g., two places on the periphery of the flange 39, thereby preventing the key top portion 33 from coming off the cover member 40 through the opening 42.

As shown in FIG. 2, the cover member 40 is a resin member having a covering portion 41 which, in a state of being mounted on the keyboard 24, forms a surface of the function key block 25 while closing the gap between each adjacent pair of key 23, and in which a certain number of openings 42 (six openings 42 in this embodiment) into which the keys 23 are to be fitted are formed.

The inside diameter of the openings 42 is set to a value larger than the outside diameter of the above-described key top portions 33 of the key member 30 and smaller than the outside diameter of the stopper 39a of the flange 39.

Positioning pins (positioning portions, pins) 43A and 43B for positioning in combination with the key member 30 are formed so as to project from the reverse surface of the covering portion 41. The lengths of the positioning pins 43A and 43B are set to different values. The shorter positioning pins 43A have only the function of positioning the key member 30, while the longer positioning pins 43B have, in addition to the key member 30 positioning function, the function of fixing the cover member 40 and the key member 30 on the unillustrated base member. That is, the longer positioning pins 43B pass through the holes 37 of the key member 30, project from the reverse side of the key member 30, and are inserted into holes formed in the base plate (not shown) on which the predetermined number of keys 23 are supported. Extreme end portions of the positioning pins 43B projecting from the reverse side of base plate (not shown) are hot welded to fix the key member 30 and the cover member 40 on the base plate (not shown).

In assembly of the function key block 25 having the above-described construction, the positioning pins 43A and 43B of the cover member 40 are inserted into the holes 37 of the key member 30. At this time, even if the cover member 40 and the key member 30 have working errors, the curved portions 36 provided in a plurality of places in the side support portions 34 of the key member 30 function so as to present any undesirable result from these errors in such a manner that the positioning pins 43A and 43B of the cover member 40, when inserted into the holes 37, correct the positions of the key top portions 33 by deforming the curved portions 36 so that the curved portions 36 expand or contract in length. Thus, even if the cover member 40 and the key member 30 have working errors, occurrence of misalignment between the openings 42 of the cover member 40 and the key top portions 33 of the key member 30 can be prevented to prevent impairment of the appearance. As described above, the function key blocks 25 in which a plurality of keys 23 are arranged in a continuous row can be formed only of the key member 30 and the cover member 40 to remarkably reduce the number of parts in comparison with the conventional complicated structure, thus reducing the parts cost and the assembly cost.

Also, the above-described construction makes it possible to absorb variations in size of the cover member 40 and the key member 30 due to working errors or temperatures by deforming the curved portions 36. Therefore it is possible to reduce the accuracy of working of the cover member 40 and the key member 30 in comparison with the conventional art. A cost reduction effect thereby achieved is also large.

Moreover, the key member 30 is arranged to have the arms 32 elastically deformed for up/down movement of the keys 23 without using a complicated structure such as the conventional up/down mechanism 2. Thus, up/down movement of the keys 23 is realized by using a markedly simple structure. Also, the arms 32 are formed so as to extend from one key top portion 33 to points on opposite sides of the next key top portion 33 so as to have a shape similar to the shape of the letter V. In this manner, the length of the arms 32 is maximized. If the arms 32 are longer, the line along which the key top portion 33 is moved up and down can be brought closer to a vertical line to ensure that a user can feel a natural key response in operating the key without being conscious of the inclination of the key top portion 33. Moreover, the generally V-shaped arms 32 enable the key top portion 33 to move up and down with stability such as not to have a roll, etc., in unnecessary directions.

The arms 32 are formed so that their sectional area is smaller at their base ends 32b remote from the key top portion 33. Therefore, elastic deformation of each arm 32 caused when the key top portion 33 is operated is concentrated in a portion closer to the base end 32b. If the arm 32 is designed so as to be uniform in sectional area, the entire arm 32 is bent so as to have a radius of curvature generally constant through its entire length. In contrast with this, deformation of the arms 32 in the above-described arrangement is concentrated in a portion closer to the base end 32b to reduce the inclination of the extreme end 32a of the arm 32, i.e., the key top portion 33. As a result, a user can feel improved key response without being conscious of turning of the key top portion 33 about the base ends 32b of the arms 32 when operating the key.

While curved portions 36 formed into a shape similar to the shape of the letter U have been described by way of example in the description of the embodiment, it is needless to say that the curved portions 36 may have any other shape, e.g., a shape similar to the shape of the letter V without any problem. Also, needless to say, any other structure allowing expansion/contraction of the key member 30 may be used.

The embodiment has been described with respect to an arrangement in which the curved portions 36 and the holes 37 (and the corresponding positioning pins 43A and 43B on the cover member 40 side) are provided in correspondence with the key top portions 33. This arrangement, however, is not exclusively be used. These components may be provided at intervals selected as desired.

While in the above-described embodiment each arm 32 is reduced in sectional area on the base end 32b side to concentrate deformation on a place closer to the base end 32b, a slit or the like formed in a place closer to the base end 32b may alternatively be used if the same function can be achieved.

Further, while in the above-described embodiment the positioning pins 43A and 43B are provided on the cover member 40, the arrangement may alternatively be such that positioning pins are provided on the base plate on which the function key block 25 is supported and the key member 30, and the cover member 40 are positioned on these positioning pins.

The function key block 25 in which six keys 23, for example, are arranged in a continuous row in one direction has been described by way of example in the description of the embodiment. However, any other key layout, e.g., an array of keys forming a plurality of rows and a plurality of columns in two directions (row and column directions) perpendicular to each other may be provided, the keys being formed by an integral member corresponding to the above-described key member 30. In such a case, portions having the size adjustment function like the above-described curved portions 36 in at least one direction (along columns or rows) are provided. More preferably similar portions for adjustment in the other direction (along rows or columns) are also provided.

A row of keys 23 constructed by attaching the cover member 40 to the key member 30 has also been described by way of example in the description of the embodiment. However, the arrangement may alternatively be such that key top members of the same type as the key top 1 shown in FIG. 6 are fitted on the key top portions 33 to form keys. In this case, the key top portions supported on the arms 32 function as a mechanism for enabling up/down movement of the key top members.

Deformation of the curved portions 36 can also be used effectively not only as the size adjustment function for absorbing working errors or the like but also as a deformation absorbing function in a case where a plurality of keys are placed along a curved surface.

The above-described key structure can be applied not only to the keyboard 24 of the PC 20 but also to keys and switches for use in various devices such as electronic desk calculators and vending machines.

The examples of the arrangement described above with respect the embodiment of the present invention may be selected or replaced with other arrangements as desired within the scope of the invention.

I claim:

1. A computer system having a display for displaying images, a control unit for controlling the computer system operations, and a keyboard for providing input to the control unit, said keyboard comprising:

a plurality of keys arranged in a continuous row in at least a first direction, each key being provided on elastically deformable arms to be capable of moving up and down; and a frame from which said arms extend, and said frame having an adjustment portion for enabling adjustment of the position of each of said plurality of keys in said first direction.

2. The computer system according to claim 1, wherein said adjustment portion is a deformable portion in said frame, which deforms in the lengthwise direction of said frame, and;

wherein said keyboard further comprises a cover member which closes space between said plurality of keys, and which comprises a positioning pin for fixing the position of said keys once adjusted.

3. A device having keys as input means, said device comprising:

a plurality of keys arranged in a continuous row in at least a first direction; each key being provided on elastically deformable arms to be capable of moving up and down; and a frame extending along said first direction and from which said arms extend, said frame comprising:

curved portions curved laterally to said first direction to allow adjustment of a pitch of said plurality of keys by deformation of said curved portions.

4. The device according to claim 3, wherein said frame is provided on both sides of said plurality of keys, each of said arms extends from said frame at a predetermined angle from said frame and has one key of said plurality of keys provided on its extreme end.

5. A keyboard having a plurality of keys, said keyboard comprising:

keys provided on elastically deformable arms to be capable of moving up and down;

a frame from which said arms extend; and a keyboard base on which said frame is fixed, said frame comprising:

an adjustment portion for adjusting the position of said keys on said keyboard base; and a positioning portion for fixing the position of said keys on said keyboard base, once adjusted.

6. The keyboard according to claim 5, wherein said keyboard further has a cover member which closes space between said plurality of keys, and said cover member is provided with a positioning pin for fixing the position of said positioning portion on said base.

7. A keyboard comprising:

a plurality of keys arranged along a first direction;

a frame on which said plurality of keys are supported so that said keys can move up and down;

a cover having openings through which said plurality of keys are exposed; and a keyboard base on which said frame and said cover are fixed, said frame comprising;

a deformable portion capable of deforming along said first direction; and holes provided on opposite sides of said deformable portion, said cover having pins which are passed through said holes of said frame to be fixed on said base.

8. The keyboard according to claim 7, wherein said frame supports each key of said plurality of keys on a pair of arms, each arm extending from said frame and each arm having one of said plurality of keys provided on its extreme end, said arms being elastically deformable.

9. A key member constituting a keyboard, said key member comprising:

a pair of side support portions opposed to each other and aligned along a first direction;

a plurality of key tops placed between said pair of side support portions; and arms respectively provided on said plurality of key tops, each arm having a first end connected to said key top and a second end connected to one of said side support portions, each arm being elastically deformable; and wherein two of said arms extend from their first ends toward said pair of side support portions so as to have a shape similar to the shape of the letter V, and at least one next adjustment key top is located generally between said two arms.

10. The key member according to claim 9, wherein each of said side support portions has a curved portion between each adjacent pair of said key tops, said curved portion being curved in a direction different from said first direction.

11. The key member according to claim 9, wherein the second ends of said arms are connected to said side support portions in the vicinity of the next adjacent key top.

12. The key member according to claim 9, wherein each of said arms is formed so that its sectional area is smaller at said second end than at said first end.

* * * * *